(12) United States Patent
Croote

(10) Patent No.: US 12,467,094 B2
(45) Date of Patent: Nov. 11, 2025

(54) METHODS AND SYSTEMS FOR PREDICTING ALLERGIC RESPONSE

(71) Applicant: IgGenix, Inc., South San Francisco, CA (US)

(72) Inventor: Derek Croote, South San Francisco, CA (US)

(73) Assignee: IGGENIX, INC., South San Francisco, CA (US)

( * ) Notice: Subject to any disclaimer, the term of this patent is extended or adjusted under 35 U.S.C. 154(b) by 733 days.

(21) Appl. No.: 17/692,408

(22) Filed: Mar. 11, 2022

(65) Prior Publication Data

US 2022/0290240 A1 Sep. 15, 2022

Related U.S. Application Data

(60) Provisional application No. 63/159,889, filed on Mar. 11, 2021.

(51) Int. Cl.
*C12Q 1/68* (2018.01)
*C12Q 1/6851* (2018.01)
*C12Q 1/6883* (2018.01)

(52) U.S. Cl.
CPC ......... *C12Q 1/6883* (2013.01); *C12Q 1/6851* (2013.01); *C12Q 2600/118* (2013.01); *C12Q 2600/158* (2013.01)

(58) Field of Classification Search
None
See application file for complete search history.

(56) References Cited

U.S. PATENT DOCUMENTS

| | | |
|---|---|---|
| 4,161,522 A | 7/1979 | Hamburger |
| 4,171,299 A | 10/1979 | Hamburger |
| 5,422,258 A | 6/1995 | Chang |
| 5,543,144 A | 8/1996 | Chang |
| 5,874,404 A | 2/1999 | Ra et al. |
| 5,965,605 A | 10/1999 | Cheng et al. |
| 5,965,709 A | 10/1999 | Presta et al. |
| 6,090,384 A | 7/2000 | Ra et al. |
| 6,210,891 B1 | 4/2001 | Nyren et al. |
| 6,299,875 B1 | 10/2001 | Caplan et al. |
| 6,306,597 B1 | 10/2001 | Macevicz |
| 6,682,735 B2 | 1/2004 | Lowman et al. |
| 6,828,100 B1 | 12/2004 | Ronaghi |
| 6,833,246 B2 | 12/2004 | Balasubramanian |
| 6,849,259 B2 | 2/2005 | Haurum et al. |
| 6,911,345 B2 | 6/2005 | Quake et al. |
| 6,919,079 B1 | 7/2005 | Fishman et al. |
| 7,101,851 B2 | 9/2006 | Lowman et al. |
| 7,232,656 B2 | 6/2007 | Balasubramanian et al. |
| 7,265,208 B2 | 9/2007 | Saxon et al. |
| 7,531,169 B2 | 5/2009 | Singh et al. |
| 7,598,035 B2 | 10/2009 | Macevicz |
| 7,835,871 B2 | 11/2010 | Kain et al. |
| 7,867,494 B2 | 1/2011 | Liu et al. |
| 7,879,334 B1 | 2/2011 | Saxon et al. |
| 7,960,120 B2 | 6/2011 | Rigatti et al. |
| 8,252,284 B2 | 8/2012 | Singh et al. |
| 8,252,907 B2 | 8/2012 | Krah, III et al. |
| 9,546,219 B2 | 1/2017 | Hammerberg |
| 10,047,166 B2 | 8/2018 | Chen et al. |
| 10,195,272 B2 | 2/2019 | Ma |
| 10,293,059 B2 | 5/2019 | Crystal et al. |
| 11,613,569 B2 | 3/2023 | Croote et al. |
| 11,709,167 B2 | 7/2023 | Smith |
| 2003/0186377 A1 | 10/2003 | Glimcher et al. |
| 2006/0024681 A1 | 2/2006 | Smith et al. |
| 2006/0292611 A1 | 12/2006 | Berka et al. |
| 2007/0009959 A1 | 1/2007 | Lawson et al. |
| 2007/0114362 A1 | 5/2007 | Feng et al. |
| 2007/0269868 A1 | 11/2007 | Carvalho Jensen et al. |
| 2010/0248267 A1 | 9/2010 | Ueda et al. |
| 2010/0330577 A1 | 12/2010 | Enzelberger |
| 2011/0009278 A1 | 1/2011 | Kain et al. |
| 2011/0190148 A1 | 8/2011 | Chen et al. |
| 2013/0022614 A1 | 1/2013 | Penichet et al. |
| 2013/0178370 A1 | 7/2013 | Lavinder et al. |
| 2013/0218474 A1 | 8/2013 | Longo |
| 2013/0295097 A1 | 11/2013 | Orengo et al. |
| 2014/0155291 A1 | 6/2014 | Yu |
| 2014/0179556 A1 | 6/2014 | Yu |
| 2014/0335098 A1 | 11/2014 | Hayday et al. |
| 2015/0141261 A1 | 5/2015 | Hunicke-Smith et al. |
| 2015/0259430 A1 | 9/2015 | Fischer et al. |
| 2016/0058377 A1 | 3/2016 | Butte et al. |

(Continued)

FOREIGN PATENT DOCUMENTS

| | | |
|---|---|---|
| WO | 99/62550 A1 | 12/1999 |
| WO | 2008/045140 A1 | 4/2008 |

(Continued)

OTHER PUBLICATIONS

Aalberse, 2000, Structural biology of allergens, MMACI 106(2):228-238.
Bremer, 2009, Biosensor immunoassay for traces of hazelnut protein in olive oil, Anal Bioanal Chem 395:119-126.
Croote, 2018, High-affinity allergen-specific human antibodies cloned from single IgE cell transcriptomes, Science 362:1306-1309.
Croote, 2018, Human IgE producing B cells have a unique transcriptional program and generate high affinity, allergen-specific antibodies. BioRxiv, 24 pages.
Crystal, 2018, The Jeremiah Metzger Lecture Novel Therapeutic strategies of Allergic and Immunologic Disorders, Trans Am Clin Climatol Assoc 129:250-265.

(Continued)

*Primary Examiner* — Jehanne S Sitton
(74) *Attorney, Agent, or Firm* — WILSON SONSINI GOODRICH & ROSATI

(57) ABSTRACT

The present invention provides systems and methods for predicting an allergic response in a subject by measuring the amounts of RNA species from B cells that encode at least a part of the Immunoglobulin E (IgE) constant region (Cε), such as nonproductive epsilon germline transcripts (εGLTs).

17 Claims, 1 Drawing Sheet

(56) References Cited

U.S. PATENT DOCUMENTS

| | | |
|---|---|---|
| 2016/0130326 A1 | 5/2016 | Meyer et al. |
| 2016/0201054 A1 | 7/2016 | Chen et al. |
| 2017/0008952 A1 | 1/2017 | Kwakkenbos et al. |
| 2017/0146551 A1 | 5/2017 | Yu |
| 2018/0044726 A1 | 2/2018 | Hunicke-Smith et al. |
| 2018/0244759 A1 | 8/2018 | Anderson et al. |
| 2019/0119359 A1 | 4/2019 | Meyer et al. |
| 2019/0352607 A1 | 11/2019 | Suga et al. |
| 2019/0353661 A1 | 11/2019 | Smith |
| 2020/0055925 A1 | 2/2020 | Li et al. |
| 2020/0263249 A1 | 8/2020 | Tam et al. |
| 2021/0246195 A1 | 8/2021 | Croote et al. |
| 2021/0317198 A1 | 10/2021 | Croote et al. |
| 2021/0317199 A1 | 10/2021 | Croote et al. |
| 2022/0153820 A1 | 5/2022 | Croote |
| 2022/0324961 A1 | 10/2022 | Nadeau |
| 2022/0412935 A1 | 12/2022 | Nadeau et al. |
| 2023/0173088 A1 | 6/2023 | Quake |
| 2023/0174632 A1 | 6/2023 | Croote et al. |
| 2023/0330226 A1 | 10/2023 | Thomas |
| 2024/0026035 A1 | 1/2024 | Smith |
| 2024/0254209 A1 | 8/2024 | Smith |

FOREIGN PATENT DOCUMENTS

| | | |
|---|---|---|
| WO | 2010/000864 A1 | 1/2010 |
| WO | 2014/067642 A1 | 5/2014 |
| WO | 2014/096389 A1 | 6/2014 |
| WO | 2018/118713 A1 | 6/2018 |
| WO | 2019/222679 A2 | 11/2019 |
| WO | WO-2022192625 A1 | 9/2022 |

OTHER PUBLICATIONS

Dobin, 2013, STAR: ultrafast universal RNA-seq aligner, Bioinformatics 29(1):15-21.

Durham, 1997, Expression of E germ-line gene transcripts and mRNA for the E heavy chain of IgE in nasal B cells and the effects of topical corticosteroid, Eur J Immunol 27(11):2899-2906.

Ehlers, 2018, Can alternative epitope mapping approaches increase the impact of B-cell epitopes in food alergy diagnostics?, Clin Exp Allergy 49:17-26.

Farrant, 1994, Germ-line transcripts and class switching, Clin Exp Immunol 95:1-2.

Fasano, 2005, The extraordinary ligand binding properties of human serum albumin, Life 57(12):787-796.

Gould, 2000, IgE isotype determination: S-germline gene transcription, DNA recombination, and B-cell differentiation, Brit Med Bull 56(4):908-924.

Gould, 2018, Peant allergen-specific antibodies go public, Science 362(6420):1247-1248.

Hoh, 2015, Single B cell deconvolution of peanut-specific antibody responses in allergic patients, J Allergy Clin Immunol 137(1):157-167.

Hu, 2018, Anti-IgE therapy for IgE-mediated allergic diseases: from neutralizing IgE antibodies to eliminating IgE+B cells, Clin Transl Allergy, pp. 1-8.

Jacqueline, 2020, Antibodies specific for disease-associated antigens (DAA) expressed in non-malignant diseases reveal potential new tumor-associated antigens (TAA) for immunotherapy or immunoprevention, Semin Immunol 47 (101394), 22 pages.

James, 2012, Allergen specificity of IgG4-expressing B cells in patients with grass pollen allergy undergoing Immunotherapy, J Allergy Clin Immunol 130(3):663-670.

Krause, 2020, IgE epitope profiling for allergy diagnostics and therapy, Front Immunol 11:565243.

Matsuo, 2015, Common food allergens and their IgE-binding epitopes, Allergology Int 64(4):332-343.

Mattoo, 2014, De novo oligoclonal expansions of circulating plasmablasts in active and relapsing lgG4-related disease, J Allerg Clim Immunol 134(3):679-687.

Monaco, 2021, Profiling serum antibodies with a pan allergen phage library identifies key wheat allergy epitopes, Nat Comm 12:379.

Mulia, 2021, Advances in the development and the applications of nonviral, episomal vectors for gene therapy, Human Gene Therapy, pp. 1076-1095.

Orengo, 2018, Treating cat allergy with monoclonal IgG antibodies that bind allergen and prevent IgE engagement, Nat Comm 9:1421.

Pekar, 2018, Stability of allergens, Mol Immunol 100:14-20.

Raposo, 2021, Human lectins, their carbohydrate affinities and where to find them, Biomolecules 11:188.

Ross, 2018, Consumer-friendly food allergen detection: moving towards smartphone-based assays, Anal Bioanal Chem 410:5353-5371.

Santos, 2015, IgG4 inhibits peanut-induced basophil and mast cell activation in peanut-tolerant children sensitized to peanut major allergens, J All Clin Imm 135(5):1249-56.

Sedov, 2021, Binding constants of clinical drug and other organic ligands with human and mammalian serum albumins, Biophysics 1:344-358.

Shah, 2019, Peanut allergy: characteristics and approaches for mitigation, Comp Rev FSFT 18:1361-1387.

Sharma, 2017, Detection of allergen markers in food: analytical methods, FDA Papers 6:65-121.

Storni, 2020, A single monoclonal antibody against peanut allergen Ara h 2 protects against systemic and local peanut allergy, Int Arch Allergy Imm 181:334-341.

Takhar, 2004, Allergen drives class switching to IgE in the nasal mucosa in allergic rhinitis, J Immunol 174 (8):5024-5032.

Tian, 2020, Basic Research and Clinical Reports Associated with Low Serum IgG4 Concentrations, Int Arch Allergy Immunol 181:146-158.

Verhoeckx, 2015, Food processing and allergenicity, Food and Chem Toxicol 80:223-240.

Wurth, 2018, Human IgE mAbs define variability in commercial Aspergillus extract allergen composition, JCI Insight, pp. 1-10.

Zhang, 2017, blocking allergic reaction through targeting surface-bound IgE with low-affinity anti-IgE antibodies, J Immunol 198(10):3823-3834.

Zhang, 2019, An integrated, accurate, rapid and economical hand-held consumer gluten detector, Food Chem 275:446-456.

Zhou, 2013, Peanut allergy, allergen composition, and methods of reducing allergenicity: a review, Int J Food Sci 2013; a909140.

Zhu, 2017, Albumin/vaccine nanocomplexes that assemble in vivo for combination cancer immunotherapy, Nat Com 8:1954.

Zorzi, 2017, Acylated heptapeptide binds albumin with high affinity and application as tag furnishes long-acting peptides, Nat Comm 8:16092.

PCT/US2022/019880 International Search Report and Written Opinion dated Jun. 16, 2022.

Coeffier, M. et al. Epsilon germ-line and IL-4 transcripts are expressed in human intestinal mucosa and enhanced in patients with food allergy. Allergy 60(6):822-827 (2005).

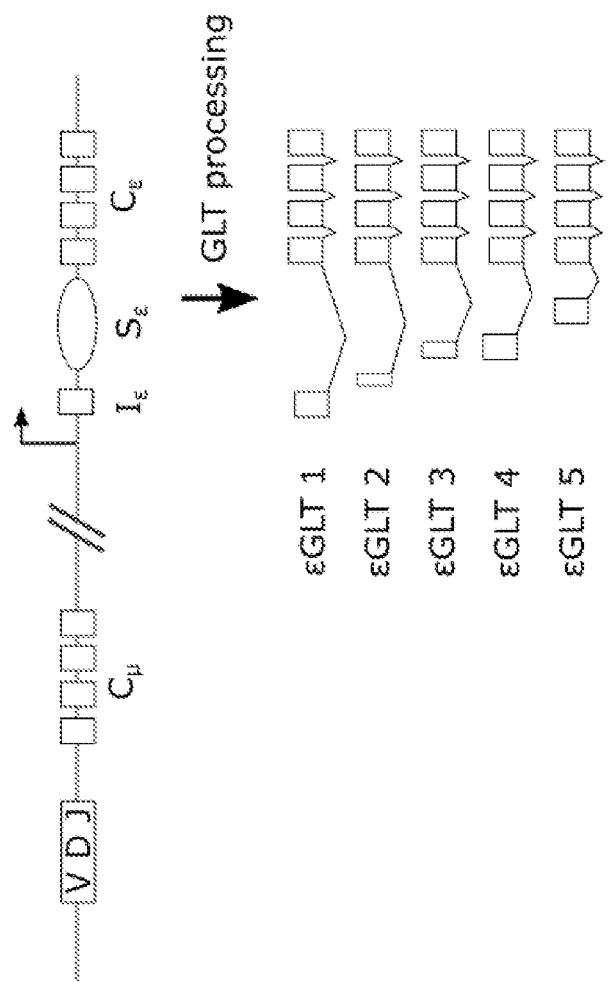

METHODS AND SYSTEMS FOR PREDICTING ALLERGIC RESPONSE

TECHNICAL FIELD

The invention generally relates to the fields of medicine, allergies, and immunology, and, more particularly, to measurement, monitoring, and prediction of allergy.

Cross-Reference

The present application claims the benefit of U.S. Provisional Application No. 63/159,889, filed Mar. 11, 2021, which is hereby incorporated by reference in its entirety.

BACKGROUND

Allergy is estimated to affect 30% of the global population. The prevalence of diagnosed allergies is continually increasing due to numerous factors, but in part by the recognition of new allergens and allergic responses as well as the increased availability of allergy tests.

Allergies are characterized by a number of conditions caused by hypersensitivity of the immune system to otherwise harmless substances in the environment. In general, an allergic reaction occurs when aspects of the immune system overreact to the presence of a substance (an allergen) that, absent the allergy, would not cause a reaction. Allergies have a negative impact on individuals' quality of life and can lead to societal and personal economic burdens. As mere exposure to certain allergens can have life-threatening consequences, people suffering from allergies are often required to be hypervigilant and forced to alter their behavior to avoid allergens.

As generally understood, an allergen is a type of antigen that produces an abnormally vigorous immune response in which the immune system combats a perceived threat that would otherwise be harmless. In technical terms, an allergen is an antigen that is capable of stimulating a type I hypersensitivity reaction mediated by Immunoglobulin E (IgE) in atopic individuals. Most humans mount significant IgE responses only as a defense against parasitic infections.

However, some individuals may respond to common environmental antigens. This hereditary predisposition is called atopy. In atopic individuals, non-parasitic antigens stimulate inappropriate IgE production, leading to type I hypersensitivity.

Emerging research has shown that allergies are not homogenous conditions. Allergy research has shown that many common allergies are more complex than previously thought. For example, patients with peanut allergies may be allergic to one or more proteins found in peanuts as well as one or more epitopes of said proteins. Further, people with a particular allergy can produce different IgE antibodies in response to the same antigen.

There are several methods for testing current allergic status in human patients. However, existing tests lack the ability to predict future allergic status.

For example, ELISA-based serum IgE testing is among the most common forms of allergy test. However, such tests are low-throughput and suffer additional drawbacks. Tests using this antibody-based method can require unique capture antibodies for every allergen tested. For example, different capture antibodies may be required to capture the different proteins and/or identify protein epitopes associated with a particular food allergy. Moreover, certain allergens can cross-react with different capture antibodies on an ELISA panel, which obfuscates the results. Thus, the breadth of antigens tested by any single panel is limited.

Another common form of allergy testing includes directly contacting a patient with an allergen, e.g., using skin prick tests, patch tests, intradermal tests, or oral food challenges. These tests pose the clear problem of directly contacting individuals with an allergen, which can lead to discomfort or more severe allergic responses. The risk of severe reactions necessarily means that tests for newly-discovered allergens undergo rigorous safety testing, which means allergy testing can lag allergen discovery. Further, extracting allergens for use in this manner of testing requires stringent and expensive manufacturing protocols to ensure high purity and the absence of contamination. Additionally, although contact testing has a high sensitivity, its specificity can be low.

SUMMARY

The present invention provides systems and methods for predicting an allergic response in a subject by measuring RNA from B cells that encode at least a part of the Immunoglobulin E (IgE) constant region (Cε), including nonproductive epsilon germline transcripts (εGLTs).

The present Inventors have determined that germline transcripts from antibody heavy chain constant region loci within B cells are predictive of future antibody class production. Those transcripts can be identified and measured to determine the propensity of B cells to undergo antibody class switch recombination to produce, for example, IgE antibodies. Thus, germline transcription is useful for predicting future allergic responses, including predisposition to allergy, and therefore leads to potential intervention.

Notably, the present invention allows accurate prediction of allergy predisposition for myriad potential allergens. Further, the presently disclosed methods and systems are useful for retrospective study of allergy development and the longitudinal dynamics of allergic status. Methods and systems of the invention are useful to predict which specific antigens from a source containing a plurality of antigens are most likely to cause an allergic response. Further, the systems and methods described herein allow accurate prediction of an intervention's therapeutic efficacy.

Thus, the present invention includes methods for predicting an allergic response. In certain methods, a body fluid or tissue sample including one or more RNA species from B cells encoding all or a fragment of an Immunoglobulin is used to predict an immunity profile for the individual from whom the sample was obtained. In a preferred embodiment, the immunoglobulin is an IgE or IgG immunoglobulin. In a highly-preferred embodiment, the fragment is an IgE or IgG heavy chain constant region. The identity of the RNA species is then determined. The types of RNA obtained and the amount thereof are used to predict an allergic response in the subject, for example, when the measured amount exceeds a predetermined threshold.

In certain methods, the threshold is determined by measuring the amounts of one or more RNA species in patients with a known allergy. The amounts measured in the patients may be taken at any time, including after the patients experience an allergic response.

Predicting an allergic response can include predicting the likelihood of developing an allergy without determining the allergen causing the predicted response. Predicting an allergic response can also include identifying at least one allergen that causes the predicted allergic response in the subject. Identified allergens can include, for example, at least one of a food allergen, a plant allergen, a fungal allergen, an animal allergen, a drug allergen, a cosmetic allergen, and a latex allergen.

The RNA species can include at least part of a nonproductive germline transcript (GLT). Thus, in certain methods, the steps of identifying and/or measuring includes assessing GLT expression in the sample. The GLT can contain one or more IgE constant region exons and thus, as an epsilon germline transcript (εGLT), include a nucleic acid sequence spliced to the 5' IgE constant region exon. The nucleic acid sequence spliced to the 5' IgE constant region exon can be from the Iε-exon or the switch region (Sε). In certain methods, identifying the one or more RNA species includes determining the presence of one or more splice junctions spanning the 5' IgE constant region exon and the Iε-exon or the switch region (Sε) in one or more εGLTs.

In certain aspects, the invention further comprises sequencing the one or more RNA species. The sequencing may include single-cell RNA-sequencing. In certain methods, identifying and/or measuring includes reverse transcription-quantitative PCR.

BRIEF DESCRIPTION OF THE DRAWING

FIG. 1 shows the production of nonproductive epsilon germline transcripts (εGLTs).

DETAILED DESCRIPTION

The present invention provides systems and methods for predicting an allergic response by measuring the expression of one or more RNA species from B cells. In preferred embodiments, the RNA encodes at least a part of the Immunoglobulin and preferably an immunoglobulin E (IgE) constant region (Cε), such as nonproductive epsilon germline transcripts (εGLTs).

IgE antibodies mediate the allergic response by binding to specific receptors on inflammatory immune cells, such as mast cells in mucosal tissues lining body surfaces and cavities, as well as basophils in the circulation. Those cells mediate allergic responses triggered by specific antigens (allergens) that are recognized by IgE through the release of inflammatory molecules, such as histamine. The inflammatory response leads to symptoms, such as sneezing, runny or stuffed nose, itchy eyes, breathing difficulties, and, in extreme cases, anaphylactic shock and even death.

Class switch recombination (CSR) is the DNA recombination process that enables switching of antibody class, and thus effector function, while maintaining the specificity of the antibody as determined by its variable region. Class switch recombination to IgE involves the replacement of an antibody heavy chain constant region gene segment with an IgE constant region (Cε) gene segment. Prior to CSR to IgE, a B cell will express a nonproductive, epsilon germline transcript (εGLT) which is the product of transcription beginning upstream of the $I_\varepsilon$-exon and proceeding through the switch region (Sε) and exons encoding the Cε. Splicing of the GLT produces an intronic lariat as well as a mature polyadenylated transcript that canonically features the Iε-exon spliced to the 5' Cε exon.

FIG. 1 diagrams the organization of the immunoglobulin heavy chain locus of a B cell expressing an IgM antibody prior to CSR to IgE. For clarity, only regions pertaining to IgE CSR are shown. A primary epsilon GLT is produced by transcription, which begins at a promoter element (arrow in FIG. 1) upstream of the Iε-exon and proceeding through the Cε exons. Splicing of this product yields one or more mature εGLTs that consist of the 5' Cε exon spliced to a unique upstream splice donor, such as the canonical Iε-exon (εGLT 1). A primer pair spanning such a splice junction can specifically amplify an εGLT.

The inventors have discovered that an assessment εGLT expression can be used to predict an allergy response and/or allergy status in an individual.

Any body fluid or tissue sample is appropriate for use in the invention. Preferably, a sample is obtained that is a source of B cells. A sample including B cells may be, for example, blood, saliva, sputum, urine, semen, transvaginal fluid, cerebrospinal fluid, sweat, stool, a cell or a tissue. Preferably, the sample is peripheral blood. Methods of the invention may further include enriching or isolating B cells from the sample. Methods of isolating or enriching B cells are known and provided, for example, in Croote et al., "Human IgE producing B cells have a unique transcriptional program and generate high affinity, allergen-specific antibodies", bioRxiv 327866; doi: https://doi.org/10.1101/327866 (2018) and Croote et al., "High-affinity allergen-specific human antibodies cloned from single IgE B cell transcriptomes", *Science,* 362, 1306-1309 (2018), each of which is incorporated herein by reference. In certain methods and systems, B cells are isolated or enriched using cell sorting flow cytometry, such as through fluorescence-activated cell sorting methods. In certain aspects, the B cells are enriched for certain B cell isotypes or certain B cell subsets. In certain aspects, enriching the B cells comprises depleting the blood sample of non-B cells. In certain aspects, enriching the B cells comprises centrifuging the blood sample, resuspending the pelleted cells, and subjecting the resuspended cells to density centrifugation.

In certain aspects, the B cells may be lysed to release the RNA. After release, the RNA may be isolated, for example, with an RNA isolation kit, such as the RNA isolation kit sold under the trade name RNeasy by Qiagen (Valencia, Calif.). The isolated RNA may be used to generate cDNA for analysis. Alternatively, the RNA may be used directly in the generation of cDNA without a dedicated isolation step. The generation of cDNA can be done using a variety of methods known in the art. The cDNA can be used to create a cDNA library for further analysis.

Methods of the invention further include identifying the RNA species and measuring the amounts of RNA in the sample. Such methods are known in the art and may include one or more methods of quantifying expression levels via single-cell or bulk RNA-Seq, RT-qPCR, direct RNA sequencing, or in-situ hybridization. Other techniques for identifying RNA include immune cells staining, immune fluorescence, flow cytometry, and sequencing. Single cell RNA detection methods (e.g., RNASeq) are useful in the context of the invention but not necessary, as the invention has the advantage of lower cost, lower complexity, and higher throughput in bulk cell measurements.

Certain methods comprise generation of cDNA. The generation of cDNA can be done using a variety of methods. For example, the cDNA can be generated using a reverse transcriptase, which has the ability to use the information in a molecule of RNA to generate a molecule of cDNA. A reverse transcriptase is an RNA-dependent DNA polymerase. Like all DNA polymerases it cannot initiate synthesis de novo but depends on the presence of a primer. Since many RNAs have a poly-A tail at the 3' end, oligo-dT is frequently used to prime DNA synthesis. It is also possible to generate cDNAs by using either random primers or primers designed to amplify a specific RNA. Once a first strand of cDNA has been created, it is generally necessary to produce a second strand of DNA. A person of skill in the art will recognize that there are many methods for producing the second strand. One mechanism involves exposure of the DNA/RNA hybrid to a combination of RNAase-H and DNA polymerase. RNAase-H has the ability to cause single-stranded nicks in the RNA, and DNA polymerase can then use these single-stranded nicks to initiate "second strand" DNA synthesis. This two-step procedure has been optimized to maximize fidelity and length of cDNAs. Following second strand synthesis, the cDNA may be amplified by PCR.

Biotinylated capture baits or probes can be used for the targeted enrichment of specific cDNA molecules of interest. The biotinylated capture probes may comprise RNA, DNA, or a hybrid of RNA and DNA nucleotides. Biotinylated RNA capture probes may be added to the cDNA library and incubated for a period of time and at a temperature sufficient for the biotinylated RNA capture probes to hybridize to their target molecules of cDNA based on Watson-Crick base pairing. For example, the mixture containing cDNA and probes may be incubated at 65 degrees Celsius for 24 hours. After hybridization, the biotinylated RNA capture probes that are hybridized with the target cDNA molecules may be captured and segregated using streptavidin or an antibody. The target cDNA molecules can then be amplified by PCR.

Library preparation is used to modify cDNA so it is compatible with the requirements of the sequencing instrument to be used. During ligation or other reactions, such as tagmentation, full or partial adapters may be incorporated into the cDNA. Preferably, the adapters may comprise sequences recognized by a sequencing platform, such as the Illumina P5/P7 (flow cell binding sequences). The adapters may also comprise PCR primer biding sites for amplifying the cDNA library. In some embodiments, the adapters may further include barcode sequences. The barcode sequences may be used to give each library in a pooled sequencing run a unique tag or identifier.

Sequencing is used to determine the nucleic acid sequence of molecules within a sequencing library. An example of a sequencing technology that can be used is Illumina sequencing. Illumina sequencing is based on sequencing by synthesis. DNA on a solid surface is amplified using fold-back PCR and anchored primers. Four fluorophore-labeled, reversibly terminating nucleotides are then used to perform sequential sequencing. After nucleotide incorporation, a laser is used to excite the fluorophores, an image is captured, and the identity of the base is recorded. Sequencing according to this technology is described in U.S. Pub. 2011/0009278, U.S. Pub. 2007/0114362, U.S. Pub. 2006/0024681, U.S. Pub. 2006/0292611, U.S. Pat. Nos. 7,960,120, 7,835,871, 7,232,656, 7,598,035, 6,306,597, 6,210,891, 6,828,100, 6,833,246, and 6,911,345, each incorporated by reference. Sequencing may include single-cell sequencing methods such as single cell RNA sequencing (scRNA-Seq) methods, whereby cells may be isolated in partitions prior to lysis and cDNA synthesis.

After sequencing, the RNA species in the sample can be identified, for example, by aligning the resulting sequence reads to a reference. When the RNA species include cGLTs, alignment may be to the GRCh38 human genome, preferably using splice-aware alignment software, such as STAR (A Dobin et al., "STAR: ultrafast universal RNA-seq aligner", *Bioinformatics,* 29, 15-21 (2013)), which is incorporated herein by reference. The Inventors have discovered that identifying one or more unique εGLTs in a sample is accomplished by identifying the presence of splice junctions spanning the 5' IgE constant region exon and either the Iε-exon or a location within the Sε.

In certain aspects, the amounts of particular RNA species in a sample are measured using sequencing. For example, relative expression may be calculated based on normalized gene counts or sequencing reads mapping to splice junctions. Additionally, cDNA from the RNA species can be labelled with barcodes and/or unique molecule identifiers to ascertain their relative expression levels.

In certain aspects, the RNA species, such as εGLTs, are identified and/or measured by RT-qPCR. In certain aspects, the RT-qPCR is one- or two-step RT-qPCR.

Methods of the invention further include predicting an allergic response. For example, methods may include predicting a subject's predisposition to experiencing an allergic response, predicting a subject's predisposition to developing an allergy, predicting a subject's allergic status, predicting a subject's allergic reaction severity, and/or predicting the likelihood that a subject experiences alleviation or elimination of an allergic response by a particular therapeutic intervention.

Methods may include determining whether expression of one or more RNA species in the sample exceeds or falls below a particular threshold. The threshold may be based on RNA expression analyses of patients with known allergies. Individuals with a known allergy may have RNA species comprising a nucleic acid sequence encoding at least a part of the Immunoglobulin E (IgE) constant region (Cε) from their B cells identified and measured. The expression levels of the RNA species may be compared to individuals without the known allergic condition and/or compared from the same patient before and after exposure to an antigen. Based on the differences in these comparisons, expression patterns of one or more unique RNA species, such as εGLTs, can be associated with allergic status or a particular allergic condition. Using these expression patterns, thresholds can be set and used to predict allergic reactions in subjects to be tested.

In certain aspects, multiple thresholds can be used. For example, thresholds among different RNA species or within a single RNA species. The thresholds can be used, for example, to determine not only that a patient is or is not likely to experience an allergic reaction, but also with a particular confidence value.

Methods of the invention may also include determining the severity of a potential allergic reaction in a subject. In certain aspects, thresholds can be set to ascertain the potential severity and type of allergic response in a subject. Similarly, methods of invention can also be used to determine the likelihood that a particular therapeutic intervention ameliorates or eliminates a particular allergic condition.

Since the invention does not require the use of antibody-based hybridization techniques, it can provide granular results. Not only can the propensity to develop an allergy be predicted, but in certain aspects, the specific allergen (e.g., protein or protein epitope) likely to cause an allergic condition can also be predicted. In certain aspects, RNA species containing an antibody variable region found in a sample are compared to an antibody database of variable regions with known specificities to predict reactivity to a particular allergen or epitope. As the present invention uses genetic information, it is not affected by the uncertainties endemic to hybridization assays using antibodies.

Similarly, since the presently disclosed systems and methods do not require the use of allergen extracts or antibodies, they can be used to concurrently test for a broad and diverse array of predicted antigen reactivities. For example, the systems and methods of the disclosure can predict an allergic reaction caused by specific allergens that may include, but are not limited to, a food allergen, a plant allergen, a fungal allergen, an animal allergen, a dust mite allergen, a drug allergen, a cosmetic allergen, or a latex allergen.

Some foods such as peanuts (a legume), nuts, seafood and shellfish are the cause of serious allergies in many people. Officially, the United States Food and Drug Administration recognizes eight foods as being common for allergic reactions in a large segment of the sensitive population. These include peanuts, tree nuts, eggs, milk, shellfish, fish, wheat and their derivatives, and soy and their derivatives, as well as sulfites (chemical-based, often found in flavors and colors in foods). Accordingly, the presently disclosed systems and methods can be used to predict an allergic response in a subject caused by a particular food or allergen found in a food.

An allergic reaction can be caused by any form of direct contact with the allergen—consuming food or drink one is sensitive to (ingestion), breathing in pollen, perfume or pet dander (inhalation), or brushing a body part against an allergy-causing plant (direct contact). The presently disclosed systems and methods can be used to predict an allergic response in a subject due to ingestion, inhalation, and/or contact with an allergen or source of allergens. Thus, the presently disclosed invention provides an obvious improvement over traditional contact-based allergy test methods, which carry the risk of reactions and may not be available for all allergens to which a subject is exposed by ingestion or inhalation.

In certain embodiments, methods and systems of the disclosure may include comparing the expression analysis results of the subject to a database of expression profiles and patterns from individuals with known allergies. The database can be continually updated. In certain aspects, a subject's RNA species expression data can be reanalyzed as the database is updated. Thus, new allergic response predictions can be made without requiring the subject to provide an additional sample. Similarly, additional information regarding patients in the database, such as clinical outcomes, medical history, genetic/epigenetic information, comorbidities, responses to treatment, and the like can be compared with a subject receiving a test to provide a more wholistic prediction that can be used to inform treatment decisions.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A method for predicting a future allergic response to one or more allergens in a subject, the method comprising:
   obtaining a blood sample from the subject;
   enriching B cells from the blood sample;
   lysing the enriched B cells to thereby release RNA;
   measuring and identifying one or more RNA species comprising a nonproductive epsilon germline transcript (εGLT) in the blood sample by performing reverse transcription followed by PCR to produce cDNA from the released RNA,
   wherein the one or more RNA species are identified by amplifying cDNA with a plurality of primers comprising a primer in a 5' Immunoglobulin E (IgE) constant region exon and either a primer in the Iε-exon or a primer in the epsilon switch region (Sε) to thereby detect GLT RNA species comprising one or more nucleic acid sequences containing a splice junction spanning the 5' IgE constant region exon and the Iε-exon or the Sε; and
   predicting the future allergic response to the one or more allergens in the subject when an amount of the measured and identified εGLT RNA species exceeds a threshold, wherein the threshold is one determined by measuring the amounts of measured and identified ¿GLT RNA species in patients with a known allergic condition.

2. The method of claim 1, wherein the predicted future allergic response is a predicted predisposition to developing an allergy to the one or more allergens.

3. The method of claim 1, wherein the predicted future allergic response is a prediction of allergic reaction severity to the one or more allergens.

4. The method of claim 1, further comprising the step of predicting alleviation or elimination of an existing allergic response to the one or more allergens.

5. The method of claim 4, further comprising the step of determining an appropriate therapeutic intervention for the allergy.

6. The method of claim 1, wherein the predicting step comprises identifying at least one allergen from the one or more allergens that causes the predicted future allergic response.

7. The method of claim 6, wherein the allergen comprises at least one of a food allergen, a plant allergen, a fungal allergen, an animal allergen, a drug allergen, a cosmetic allergen, and a latex allergen.

8. The method of claim 1, wherein the one or more RNA species is one produced by germline transcription.

9. The method of claim 1, wherein the one or more nucleic acid sequences contain a splice junction comprising the 5' IgE constant region exon and the Iε-exon.

10. The method of claim 1, wherein the one or more nucleic acid sequences contain a splice junction comprising the 5' IgE constant region exon is and the Sε.

11. The method of claim 1, wherein the measuring and identifying step further comprises sequencing the one or more RNA species.

12. The method of claim 11, wherein the sequencing step comprises bulk RNA-Seq, single-cell RNA-Seq, direct RNA sequencing, or in-situ hybridization.

13. The method of claim 1, wherein amplifying the cDNA further comprises using biotinylated capture probes.

14. The method of claim 1, wherein the measuring and identifying step further comprises reverse transcription-quantitative PCR.

15. The method of claim 1, wherein enriching the B cells comprises fluorescence activated cell sorting (FACS).

16. The method of claim 1, wherein enriching the B cells comprises depleting the blood sample of non-B cells.

17. The method of claim 1, wherein enriching the B cells comprises centrifuging the blood sample, resuspending the pelleted cells, and subjecting the resuspended cells to density centrifugation.

* * * * *

UNITED STATES PATENT AND TRADEMARK OFFICE
CERTIFICATE OF CORRECTION

| | |
|---|---|
| PATENT NO. | : 12,467,094 B2 |
| APPLICATION NO. | : 17/692408 |
| DATED | : November 11, 2025 |
| INVENTOR(S) | : Derek Croote |

It is certified that error appears in the above-identified patent and that said Letters Patent is hereby corrected as shown below:

In the Claims

In Column 8, Line 1, Claim 1: replace "(&GLT)" with -- (εGLT) --.
In Column 8, Lines 7-9, Claim 1: replace "the Is-exon or a primer in the epsilon switch region (Se) to thereby detect GLT RNA species" with -- the Iε-exon or a primer in the epsilon switch region (Sε) to thereby detect εGLT RNA species --.
In Column 8, Line 11, Claim 1: replace "Is-exon or the Se" with -- Iε-exon or the Sε --.
In Column 8, Line 14, Claim 1: replace "&GLT" with -- εGLT --.
In Column 8, Line 14, Claim 1: replace "¿GLT" with -- εGLT --.

Signed and Sealed this
Thirtieth Day of December, 2025

John A. Squires
*Director of the United States Patent and Trademark Office*